United States Patent
Mathew et al.

(10) Patent No.: US 7,693,926 B2
(45) Date of Patent: Apr. 6, 2010

(54) MODULAR MULTIPLICATION ACCELERATION CIRCUIT AND METHOD FOR DATA ENCRYPTION/DECRYPTION

(75) Inventors: Sanu Mathew, Hillsboro, OR (US); Ram Krishnamurthy, Portland, OR (US); Zheng Guo, Berkeley, CA (US)

(73) Assignee: Intel Corporation, Santa Clara, CA (US)

(*) Notice: Subject to any disclaimer, the term of this patent is extended or adjusted under 35 U.S.C. 154(b) by 1042 days.

(21) Appl. No.: 11/393,392

(22) Filed: Mar. 30, 2006

(65) Prior Publication Data

US 2007/0233772 A1 Oct. 4, 2007

(51) Int. Cl.
*G06F 7/38* (2006.01)
(52) U.S. Cl. ...................................... 708/491
(58) Field of Classification Search .................. 708/491
See application file for complete search history.

(56) References Cited

U.S. PATENT DOCUMENTS 6,356,636 B1 * 3/2002 Foster et al. ................. 708/491

OTHER PUBLICATIONS

Burke, Jerome et al., "Architectural Support for Fast Symmetric-Key Cryptography", Advanced Computer Architecture Laboratory, 12pgs., year 2000.

Tenca, Alexandre F. et al., "A Scalable Architecture for Modular Multiplication Based on Montgomery's Algorithm", IEEE Transactions on Computers, vol. 52, No. 9, Sep. 2003, pp. 1215-1221.

* cited by examiner

*Primary Examiner*—Tan V Mai
(74) *Attorney, Agent, or Firm*—Buckley, Maschoff & Talwalkar LLC

(57) ABSTRACT

A system to process multiplier X and multiplicand Y may include multiplication of a least-significant bit of X and a least-significant w bits of Y to generate a least-significant w bits of product Z. The system may further include determination of whether a least-significant bit of product Z is 1, addition of a least-significant w bits of modulus M to the least-significant w bits of product Z if the least-significant bit of product Z is 1, multiplication of the least-significant bit of X and bits 2w-1:w of Y to generate bits 2w-1:w of product Z, and addition of bits 2w-1:w of modulus M to bits 2w-1:w of product Z if the least-significant bit of product Z is 1. Multiplying the least-significant bit of X and bits 2w-1:w of Y may occur at least partially contemporaneously with multiplying the least-significant bit of X and the least-significant w bits of Y, determining if the least-significant bit of product Z is 1, and adding the least-significant w bits of modulus M to the least-significant w bits of product Z if the least-significant bit of product Z is 1.

18 Claims, 10 Drawing Sheets

$M = (M^{(e-1)}, \ldots, M^1, M^0)$,
$Y = (Y^{(e-1)}, \ldots, Y^1, Y^0)$,
$Z = (Z^{(e-1)}, \ldots, Z^1, Z^0)$,
$X = (x_{n-1}, \ldots, x_1, x_0)$ $Z = 0$ for $i = 0$ to $n-1$ $(C_a, Z^0) = x_i * Y^0 + Z^0$ odd $= z_0$ if odd then $(C_a, Z^0) = M^0 + Z^0$ for $j = 1$ to $e$ $(C_a, Z^j) = C_a + x_i * Y^j + Z^j$ if odd then $(C_b, Z^j) = C_b + M^j + Z^j$ $Z^{j-1} = (Z^j_0, Z^{j-1}_{w-1:1})$

FIG. 1

MODULAR MULTIPLICATION ACCELERATION CIRCUIT AND METHOD FOR DATA ENCRYPTION/DECRYPTION

BACKGROUND

Several conventional encryption protocols require modular multiplication of extremely long numbers (e.g., 1024+ bits) using an arbitrary modulus. This operation requires division by a large prime modulus, and may therefore consume significant computing resources. Montgomery multiplication is a known method for simplifying this operation into shifts which can be implemented using dedicated hardware accelerators. FIG. 1 illustrates a Montgomery multiplication algorithm to generate output Z based on n-bit multiplier X, multiplicand Y and modulus M.

According to the algorithm, w bits of Y are multiplied by a bit of X to produce a running sum of a corresponding w bits of Z. If the least-significant bit of Z is odd, the corresponding w bits of M are added to the running sum. The process is executed until each w bits of Y are multiplied by each bit of X.

FIG. 2 illustrates pipeline timings 200 and 250 to implement the algorithm according to conventional systems. Pipeline timing 200 represents a scenario in which a number p of w-bit processing elements (PEs) is small compared to the total words e to be processed (e==n/w). As shown, pipeline timings 200 and 250 parallelize the outer loop of the algorithm (i.e., i=0, 1, ..., n−1) by simultaneously operating on adjacent bits of X using adjacent PEs. However, due to read-after-write hazards at bits w-1, 2w-1, 3w-1, etc., stalls are inserted between successive iterations of the outer loop. For example, PE2 does not begin processing until t=3. Moreover, as shown in pipeline timing 250, kernel stalls must be inserted between iterations of the inner loop (i.e., j=1, 2, ..., e) in a case that p is not small compared to e. Such stalls compromise the performance of conventional Montgomery multiplier implementations.

BRIEF DESCRIPTION OF THE DRAWINGS

FIG. 1 illustrates a Montgomery multiplication algorithm.

DETAILED DESCRIPTION

Figure 2:
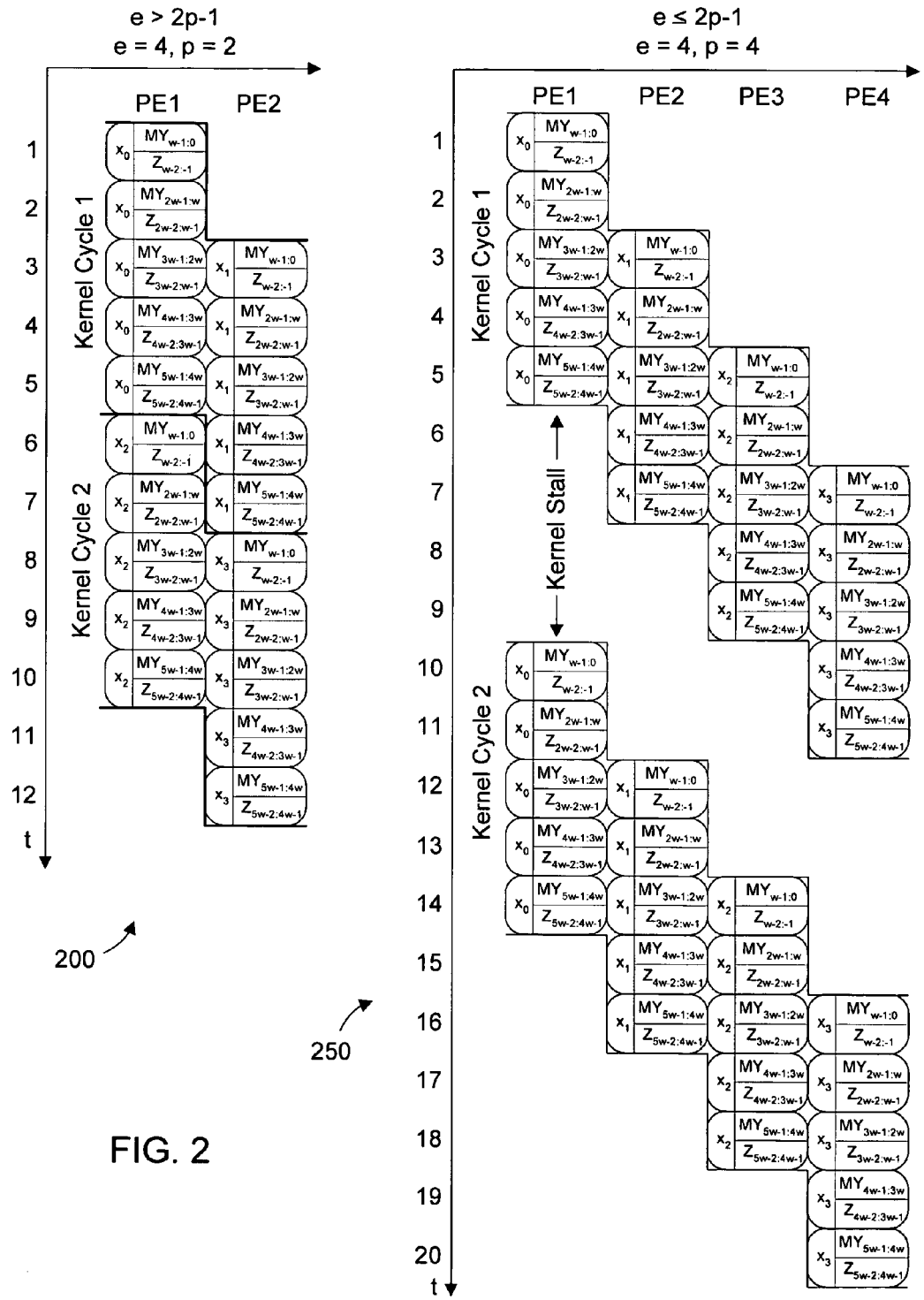
FIG. 2 illustrates pipeline timings of a conventional Montgomery multiplication algorithm implementation.
Figure 3:
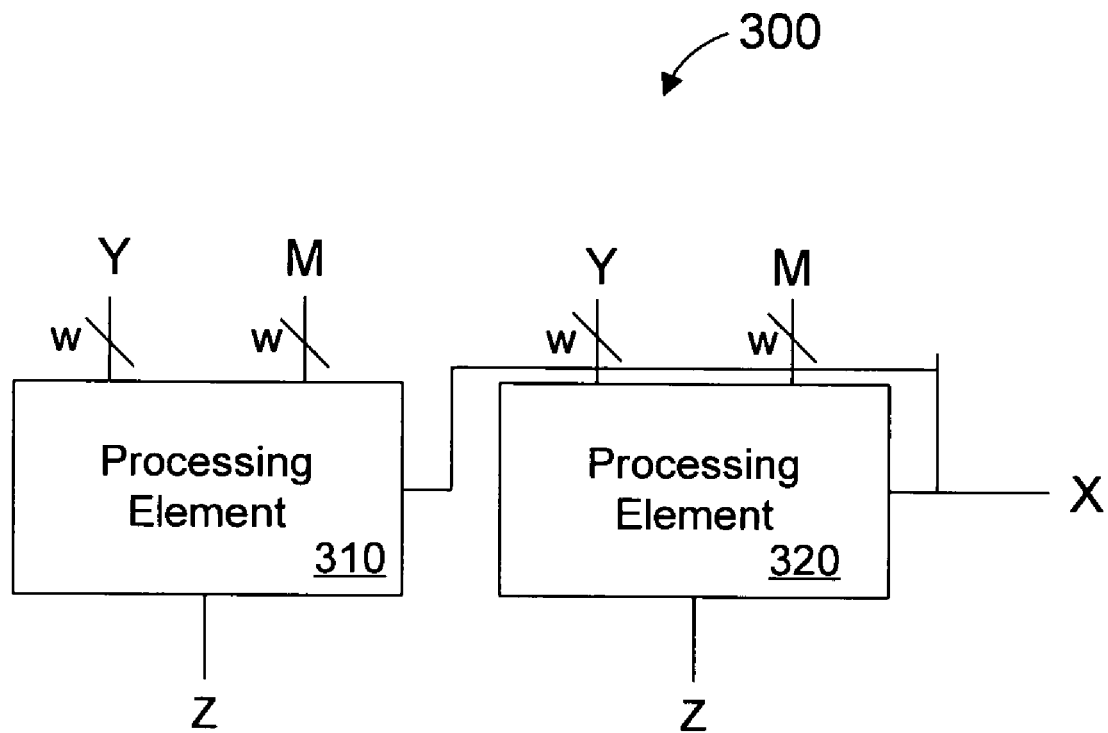
FIG. 3 is a block diagram of an apparatus according to some embodiments.

FIG. 3 illustrates apparatus 300 according to some embodiments. Apparatus 300 may comprise an element of an encryption accelerator. The encryption accelerator may be embodied as a functional block of a microprocessor, in a dedicated integrated circuit, or in any other manner that is or becomes known. In some embodiments, apparatus 300 is to facilitate Montgomery multiplication.

For example, processing element 310 may receive w bits of multiplicand Y, w bits of modulus M, and one bit of multiplier X. In operation, processing element 310 may multiply a least-significant bit of X and a least-significant w bits of Y to generate a least-significant w bits of product Z, and add a least-significant w bits of modulus M to the least-significant w bits of product Z if the least-significant bit of product Z is 1.

Processing element 320 may, in turn, multiply the least-significant bit of X and bits 2w-1:w of Y to generate bits 2w-1:w of product Z, and add bits 2w-1:w of modulus M to bits 2w-1:w of product Z if the least-significant bit of product Z is 1. Multiplication of the least-significant bit of X and bits 2w-1:w of Y by processing element 320 may occur at least partially contemporaneously with the aforementioned multiplication and addition of processing element 310.

Figure 5:
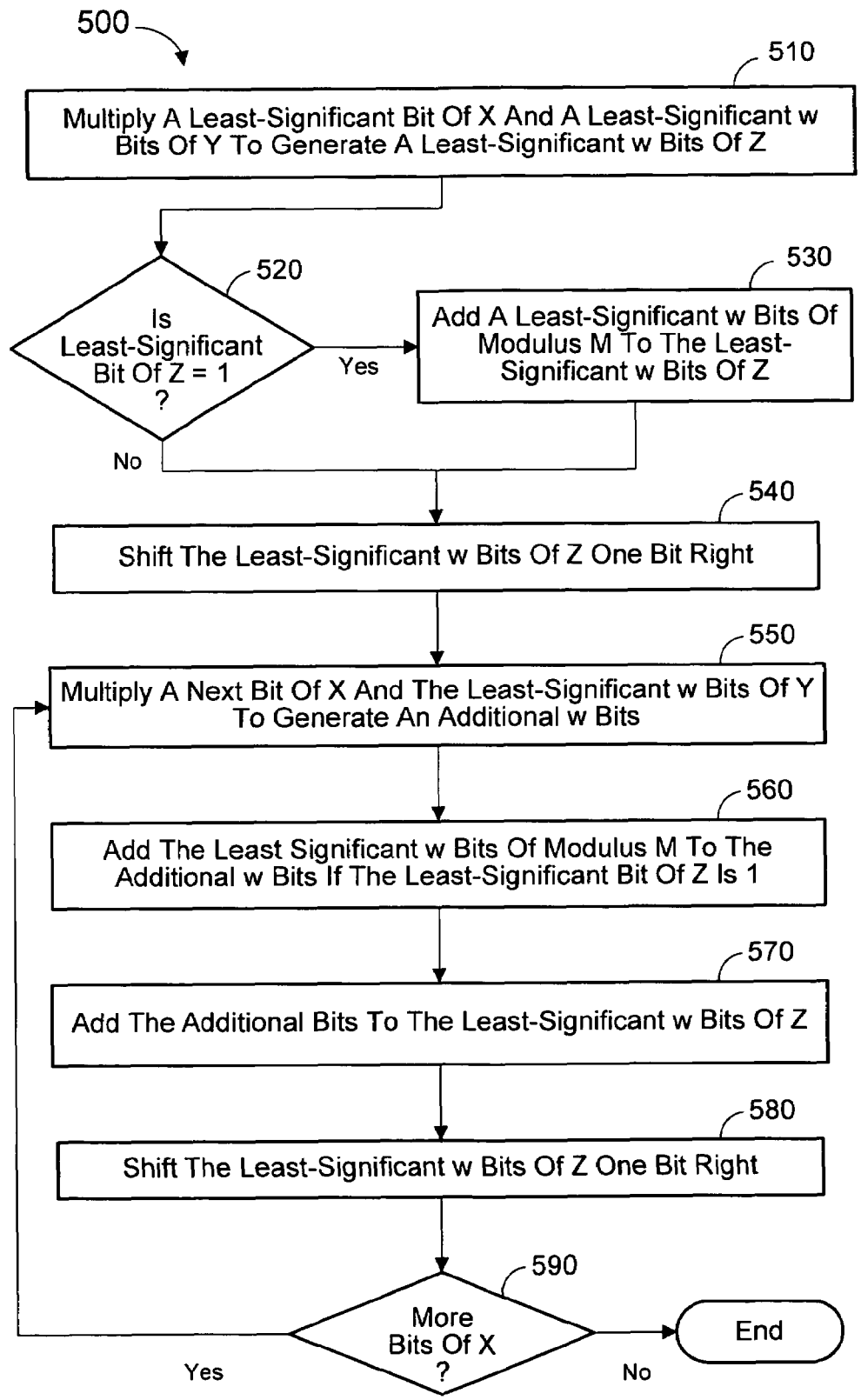
FIG. 5 is a flow diagram of a process according to some embodiments.

Pipeline timing 400 of FIG. 5 illustrates the foregoing sequence according to some embodiments. As shown, the number p of PEs equals the number of w-bit words within multiplicand Y. The following explanation of pipeline timing 400 will assume that processing elements 310 and 320 correspond to PE1 and PE2, respectively.

At time t=1, processing element 310 multiplies the least-significant bit of X ($x_0$) and a least-significant w bits of Y ($Y_{w-1:0}$) to generate a least-significant w bits of product Z ($Z_{w-1:0}$). Processing element 310 also adds a least-significant w bits of modulus M ($M_{w-1:0}$) to the least-significant w bits of product Z if the least-significant bit of product Z is 1. Accordingly, processing element 310 may also determine at time t=1 that the least-significant bit of product Z is 1. Processing element 310 then shifts the current least-significant w bits of product Z one bit to the right to generate $Z_{w-2:1}$ as shown.

Similarly, at time t=1, processing element 320 multiplies the least-significant bit of X ($x_0$) and bits 2w-1:w of Y to generate bits 2w-1:w of product Z. Processing element 320 adds bits 2w-1:w of modulus M to bits 2w-1:w of product Z if the least-significant bit of product Z is 1. Bits 2w-1:w of product Z are then shifted one bit to the right to generate $Z_{2w-1\ 2:w-1\ 1}$ as shown.

At least some of the foregoing operations of processing elements 310 and 320 are contemporaneous. In other words, the foregoing operations result in parallelization of the outer loop of the Montgomery multiplier algorithm (i.e., j=1, 2, ..., e) using two or more w-bit PEs. Such features thereby address the read-after-write hazards described above, and, in some embodiments, may eliminate a need to insert the conventional stalls also described above.

Figure 4:
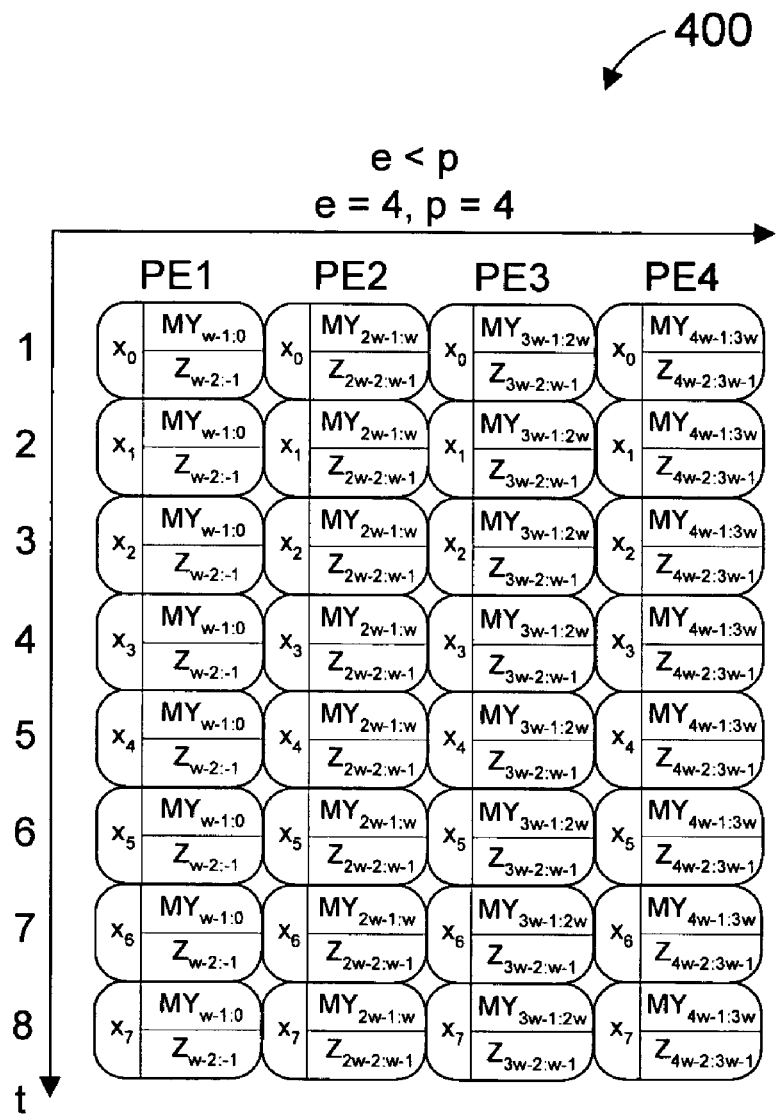
FIG. 4 illustrates a pipeline timing according to some embodiments.

FIG. 5 is a detailed flow diagram of method 500 to process multiplier X and multiplicand Y according to some embodiments. Method 200 may be executed by, for example, processing element 310 of system 300 and/or PE1 of FIG. 4. Corresponding methods may be contemporaneously executed by other processing elements such as processing element 320 and/or PE2-PE4 of FIG. 4. Any of the methods described herein may be performed by hardware, software (including microcode), or a combination of hardware and software.

At 510, a least-significant bit of X and a least-significant w bits of Y are multiplied to generate a least-significant w bits of Z. Next, at 520, it is determined whether the least-significant bit of Z is equal to 1 (i.e., odd). If so, flow proceeds to 530. A least-significant w bits of a modulus M is added at 530 to the least-significant w bits of Z.

Flow proceeds to 540 from 530, or directly from 520 if the least-significant bit of Z is not equal to 1. At 540, the least-significant w bits of Z are shifted one bit to the right. Pipeline timing 400 illustrates the foregoing process as executed by PE1 during time t=1. More particularly, pipeline timing 400 shows PE1 operating on the least-significant bit of X (i.e., $x_0$) and the least-significant w bits of M and Y (i.e., $MY_{w-1:0}$) to result in right-shifted output $Z_{w-2:1}$.

Continuing with method 500, a next bit of X and the least-significant w bits of Y are multiplied at 550 to generate an additional w bits. If the least-significant bit of Z was determined to be 1 at 520, the least-significant w bits of modulus M are added to the additional w bits at 560. Next, at 560, the additional bits are added to the current least-significant w bits of Z (i.e., $Z_{w-1:0}$). The least-significant w bits of Z are shifted one bit to the right at 580. PE1 of pipeline timing 400 executes 550 through 580 during time t=2.

If more bits of X are determined to exist at 590, flow returns therefrom to 550 and continues as described above. The resulting cycling from 550 through 590 is illustrated in pipeline timing 400 by the operands of PE1 at each successive time period. Pipeline timing 400 and method 500 reflect a scenario in which e=p, and in which a single processing element always operates on a same w bits of M and Y.

Figure 6:
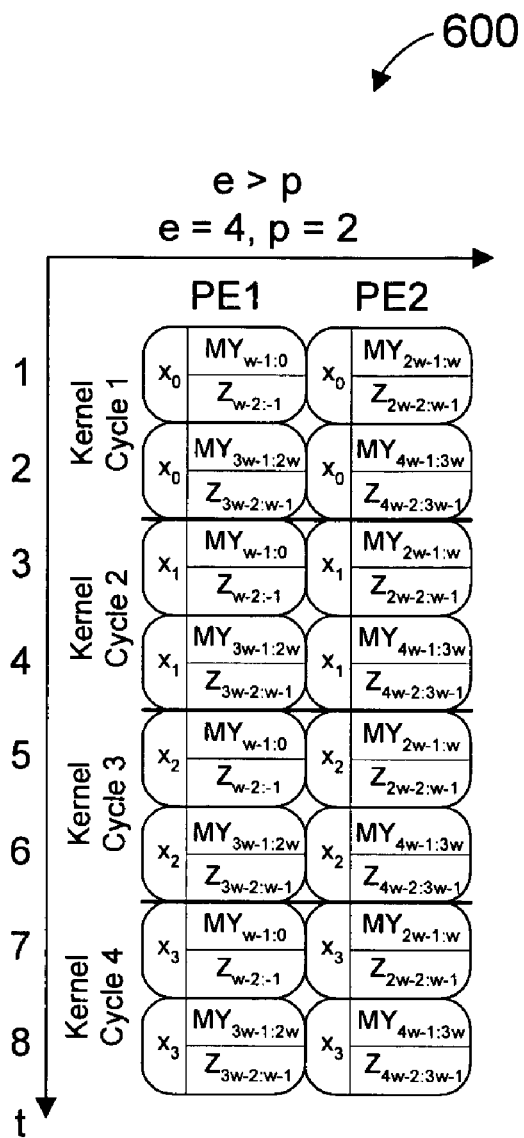
FIG. 6 illustrates a pipeline timing according to some embodiments.

FIG. 6 shows pipeline timing 600 in which e>p, and therefore a single processing element may at different times operate on different w bits of M and Y. Moreover, unlike the implementation reflected in pipeline timing 400, two processing elements may operate on a same bit of multiplier X.

Figure 7:
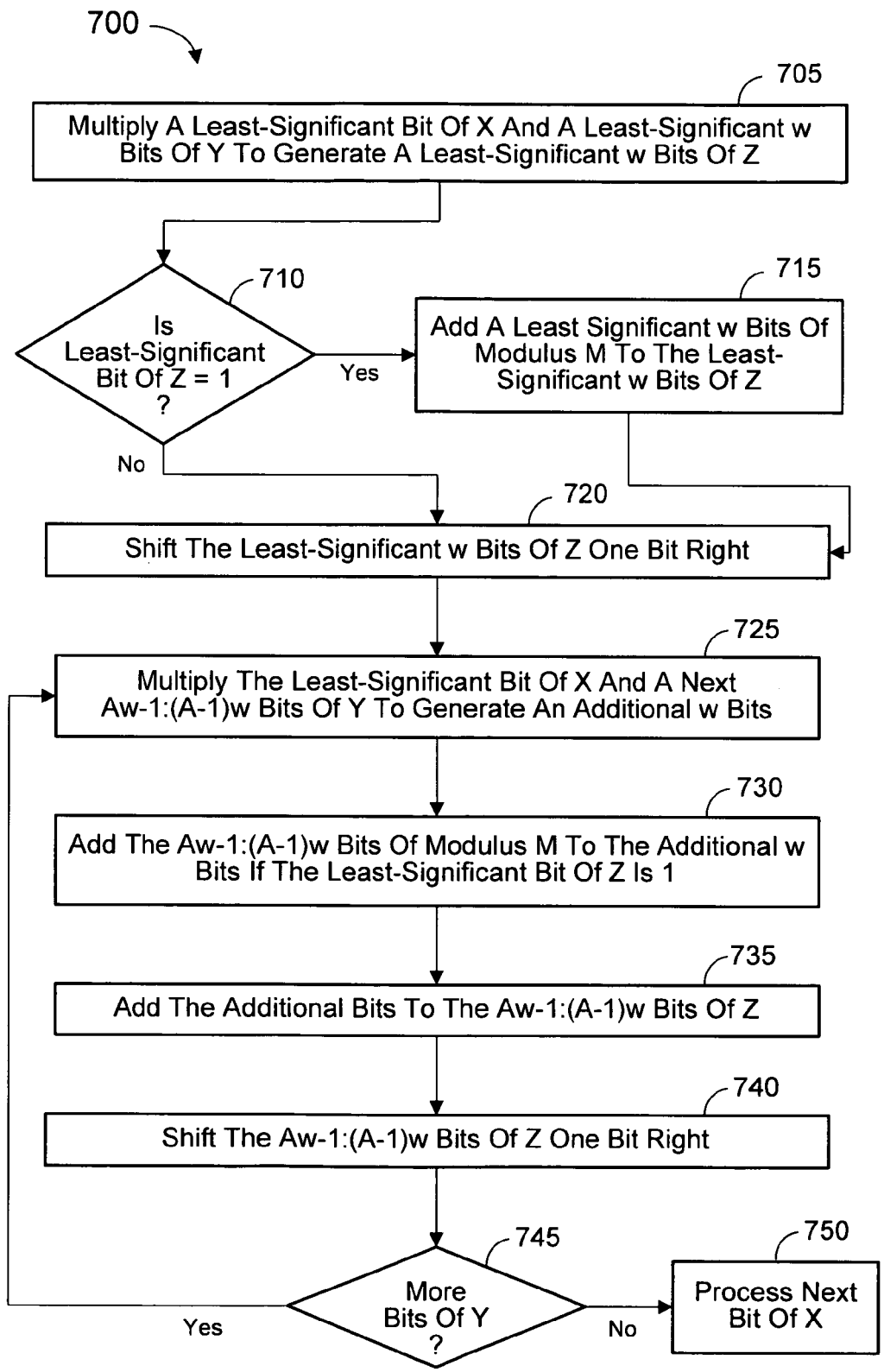
FIG. 7 is a flow diagram of a process according to some embodiments.

FIG. 7 illustrates method 700 that may be executed by PE1 of FIG. 6. As shown in FIG. 6, PE2 may contemporaneously execute a corresponding method.

Initially, at 705, a least-significant bit of X and a least-significant w bits of Y are multiplied at 705 to generate a least-significant w bits of Z. Next, at 710, it is determined whether the least-significant bit of Z is equal to 1. If so, a least-significant w bits of modulus M are added at 715 to the least-significant w bits of Z. Flow then continues to 720.

Flow also continues to 720 directly from 710 if it is determined that the least-significant bit of Z is not equal to 1. The least-significant w bits of Z are shifted one bit to the right at 720. The above-described elements of method 700 may be executed by PE1 during time t=1 as shown in pipeline timing 600. Pipeline timing 600 shows PE1 operating on the least-significant bit of X (i.e., $x_0$) and the least-significant w bits of M and Y (i.e., $MY_{w1:0}$) to result in right-shifted output $Z_{w-2:1}$.

The least-significant bit of X and a next Aw-1:(A-1)w bits of Y (i.e., $Y_{Aw-1:(A-1)w}$), with A>1, are multiplied at 725 to generate an additional w bits. If the least-significant bit of Z was determined to be 1 at 710, the Aw-1:(A-1)w bits of modulus M (i.e., $M_{Aw-1:(A-1)w}$) are added to the additional w bits at 730. Next, at 735, the additional w bits are added to the current Aw-1:(A-1)w bits of Z (i.e., $Z_{Aw-1:(A-1)w}$). The Aw-1:(A-1)w bits of Z are then shifted one bit to the right at 740. Pipeline timing 600 shows PE1 executing 725 through 740 during time t=2.

It is then determined, at 745, whether more bits of Y remain to be multiplied by the least-significant bit of X. If so, flow returns to 725 and continues as described above. If not, a next bit of X is processed at 750. Processing of a next bit of X by PE1 at time t=3 is reflected in pipeline timing 600. Processing of the next as well as subsequent bits of X may roughly proceed as described with respect to 705 through 745.

Figure 8:
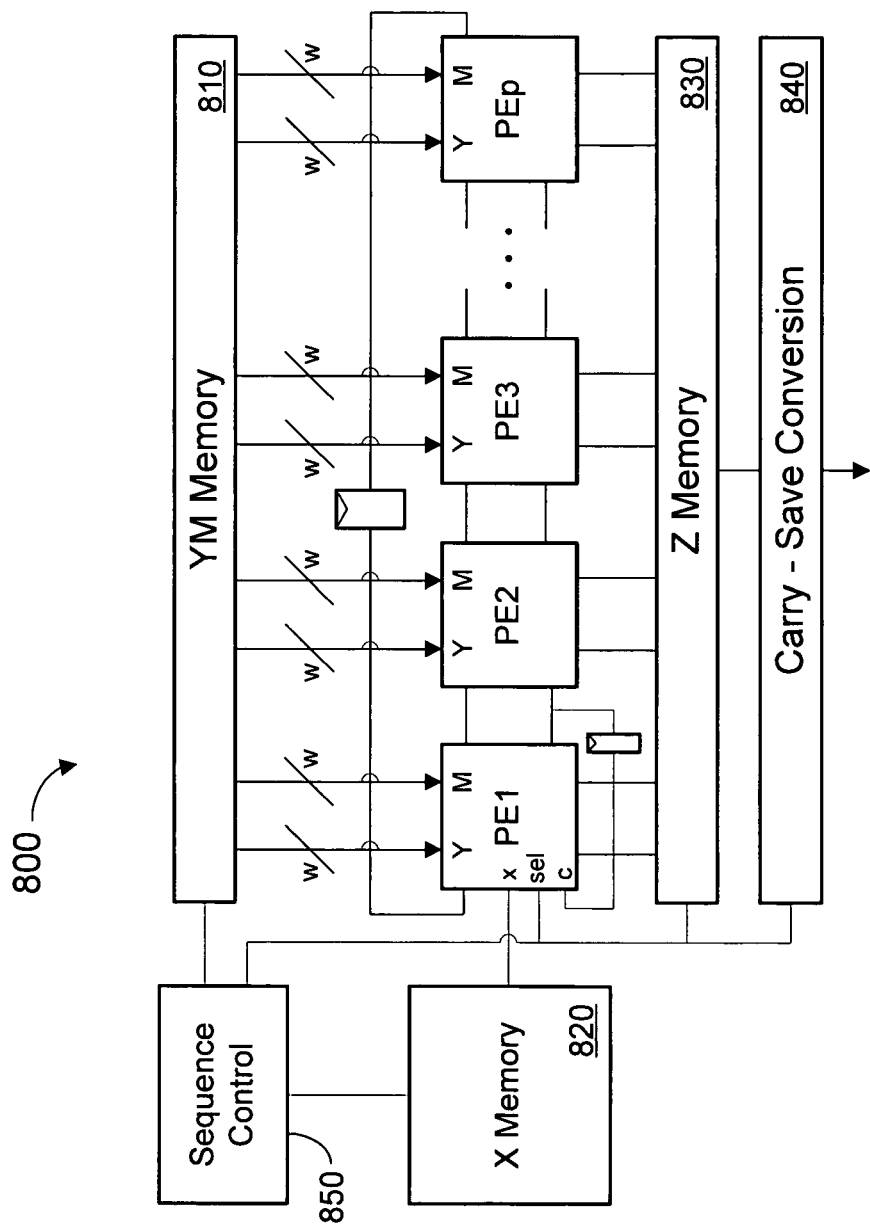
FIG. 8 is a block diagram of an apparatus according to some embodiments.

FIG. 8 is a block diagram of system 800 according to some embodiments. System 800 may comprise elements of an encryption accelerator embodied in any suitable form. System 800 includes processing elements PE1 through PEp, any of which may operate as described above with respect to processing elements 310 and 320 and methods 500 and 700. As shown, processing elements PE1 through PEp each receive w bits of multiplicand Y and of modulus M from YM memory 810, and one bit of multiplier X from X memory 820.

System 800 also includes Z memory 830 for storing a running sum for each bit of Z in a redundant format, such as Carry-Save format. After execution of the FIG. 1 algorithm according to some embodiments, the redundant format is converted to a non-redundant format by Carry-Save conversion unit 840. In this regard, sequence control 850 may control the elements of system 800 to operate in accordance with a desired implementation of the algorithm.

Figure 9:
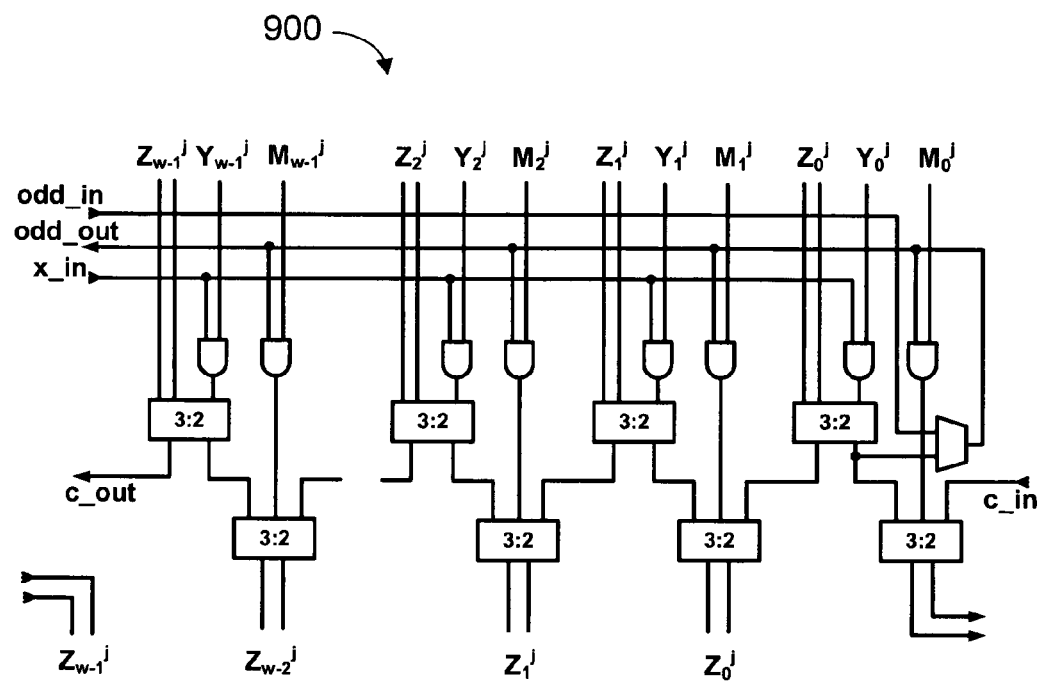
FIG. 9 is a schematic diagram of a processing element according to some embodiments.

FIG. 9 is a schematic diagram of a w-bit processing element according to some embodiments. The illustrated elements of PE900 may be implemented using any systems to implement circuit elements (e.g., semiconductors, discrete elements, software) that are or become known.

PE 900 multiplies one bit of X by w bits of Y and adds the result to a running sum. If the least significant bit of the running sum is 1, PE 900 also adds a corresponding w bits of M to the running sum. As described above, the sum is right-shifted by one bit.

According to some embodiments, no registers are required between adjacent processing elements such as PE 900. Rather, all stored results (i.e., bits of Z) are read or written at a beginning of each cycle by all processing elements. Such a feature may reduce a complexity of sequence control with respect to conventional systems.

Figure 10:
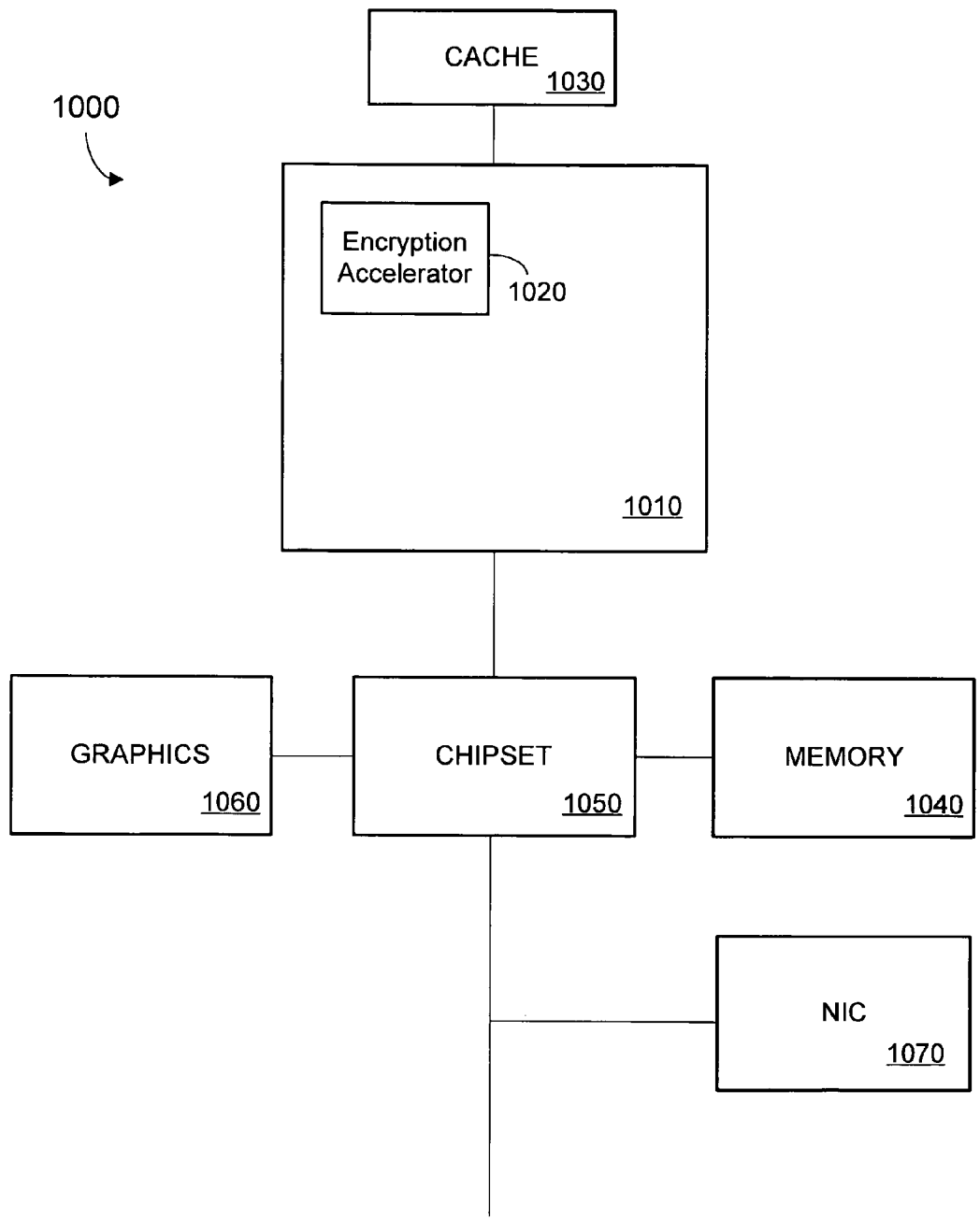
FIG. 10 is a block diagram of a system according to some embodiments.

FIG. 10 illustrates a block diagram of system 1000 according to some embodiments. System 1000 includes integrated circuit 1010 which may be a microprocessor or another type of integrated circuit. Integrated circuit 1010 includes Encryption Accelerator 1020 according to some embodiments described herein.

Integrated circuit 1010 also communicates with off-die cache 1030. Off-die cache 1030 may include registers storing a multiplier, a multiplicand, and/or a modulus for input to Encryption Accelerator 1020. Integrated circuit 1010 may also communicate with system memory 1040 via a host bus and a chipset 1050. Memory 1040 may comprise any suitable type of memory, including but not limited to Single Data Rate Random Access Memory and Double Data Rate Random Access Memory. In addition, other off-die functional units, such as graphics accelerator 1060 and Network Interface Controller (NIC) 1070 may communicate with integrated circuit 1010 via appropriate busses.

Some embodiments provide parallelization of the inner loop (i.e., j=1, 2, ..., e) and serialization of the outer loop (i.e., i=0, 1, ..., n-1) of the Montgomery multiplier algorithm. Such features may decrease a number and/or duration of pipeline stalls, resulting in increased pipeline utilization and simplified control. Embodiments may consequently provide faster operation and decreased power consumption.

The several embodiments described herein are solely for the purpose of illustration. Therefore, persons in the art will recognize from this description that other embodiments may be practiced with various modifications and alterations.

What is claimed is:

1. A method to process multiplier X and multiplicand Y, comprising:

multiplying, via a processing element, a least-significant bit of X and a least-significant w bits of Y to generate a least-significant w bits of product Z;

determining if a least-significant bit of product Z is 1;

adding a least-significant w bits of modulus M to the least-significant w bits of product Z if the least-significant bit of product Z is 1;

multiplying the least-significant bit of X and bits 2w-1:w of Y to generate bits 2w-1:w of product Z; and adding bits 2w-1:w of modulus M to bits 2w-1:w of product Z if the least-significant bit of product Z is 1, wherein multiplying the least-significant bit of X and bits 2w-1:w of Y occurs at least partially contemporaneously with multiplying the least-significant bit of X and the least-significant w bits of Y, determining if the least-significant bit of product Z is 1, and adding the least-significant w bits of modulus M to the least-significant w bits of product Z if the least-significant bit of product Z is 1.

2. A method according to claim 1, further comprising:

multiplying bit one of X and a least-significant w bits of Y to generate an additional w bits;

adding a least-significant w bits of modulus M to the additional w bits if the least-significant bit of product Z is 1; and adding the additional w bits to the least-significant w bits of product Z.

3. A method according to claim 2, further comprising:

multiplying bit one of X and bits 2w-1:w of Y to generate a second additional w bits;

adding bits 2w-1:w of modulus M to the second additional w bits if the least-significant bit of product Z is 1; and adding the second additional w bits to bits 2w-1:w of product Z, wherein multiplying bit one of X and bits 2w-1:w of Y occurs at least partially contemporaneously with multiplying bit one of X and the least-significant w bits of Y, adding the least-significant w bits of modulus M to the additional w bits of product Z if the least-significant bit of product Z is 1, and adding the additional w bits of product Z to the least-significant w bits of product Z.

4. A method according to claim 1, further comprising:

multiplying the least-significant bit of X and bits 3w-1:2w of Y to generate bits 3w-1:2w of product Z; and adding bits 3w-1:2w of modulus M to bits 3w-1:2w of product Z if the least-significant bit of product Z is 1, wherein multiplying the least-significant bit of X and bits 3w-1:2w of Y occurs at least partially contemporaneously with multiplying the least-significant bit of X and the least-significant w bits of Y, determining if the least-significant bit of product Z is 1, and adding the least-significant w bits of modulus M to the least-significant w bits of product Z if the least-significant bit of product Z is 1.

5. A method according to claim 1, wherein the bits of product Z are expressed in a redundant format, and further comprising:

converting product Z from a redundant format to a non-redundant format after multiplying a most significant bit of X and a most-significant w bits of Y to generate a most-significant w bits of product Z.

6. A method according to claim 1, further comprising:

multiplying the least-significant bit of X and bits Aw-1:(A-1)w, A>1, of Y to generate bits Aw-1:(A-1)w of product Z;

adding bits Aw-1:(A-1)w of modulus M to bits Aw-1:(A-1)w of product Z if the least-significant bit of product Z is 1;

multiplying the least-significant bit of X and bits (A+1)w-1:Aw of Y to generate bits (A+1)w-1:Aw of product Z; and adding bits (A+1)w-1:Aw of modulus M to bits (A+1)w-1:Aw of product Z if the least-significant bit of product Z is 1, wherein multiplying the least-significant bit of X and bits (A+1)w-1:Aw of Y occurs at least partially contemporaneously with multiplying the least-significant bit of X and bits Aw-1:(A-1)w of Y, and adding bits Aw-1:(A-1)w of modulus M to the bits Aw-1:(A-1)w of product Z if the least-significant bit of product Z is 1.

7. An apparatus to process multiplier X and multiplicand Y, comprising:

a first processing element to multiply a least-significant bit of X and a least-significant w bits of Y to generate a least-significant w bits of product Z, and to add a least-significant w bits of modulus M to the least-significant w bits of product Z if the least-significant bit of product Z is 1; and a second processing element to multiply the least-significant bit of X and bits 2w-1:w of Y to generate bits 2w-1:w of product Z, and to add bits 2w-1:w of modulus M to bits 2w-1:w of product Z if the least-significant bit of product Z is 1, wherein multiplying the least-significant bit of X and bits 2w-1:w of Y occurs at least partially contemporaneously with multiplying the least-significant bit of X and the least-significant w bits of Y, and adding the least-significant w bits of modulus M to the least-significant w bits of product Z if the least-significant bit of product Z is 1.

8. An apparatus according to claim 7, the first processing element further to multiply bit one of X and a least-significant w bits of Y to generate an additional w bits, to add a least-significant w bits of modulus M to the additional w bits if the least-significant bit of product Z is 1, and to add the additional w bits to the least-significant w bits of product Z.

9. An apparatus according to claim 8, the second processing element further to multiply bit one of X and bits 2w-1:w of Y to generate a second additional w bits, to adding bits 2w-1:w of modulus M to the second additional w bits if the least-significant bit of product Z is 1, and to add the second additional w bits to bits 2w-1:w of product Z, wherein multiplying bit one of X and bits 2w-1:w of Y occurs at least partially contemporaneously with multiplying bit one of X and the least-significant w bits of Y, adding the least-significant w bits of modulus M to the additional w bits of product Z if the least-significant bit of product Z is 1, and adding the additional w bits of product Z to the least-significant w bits of product Z.

10. An apparatus according to claim 7, further comprising:

a third processing element to multiply the least-significant bit of X and bits 3w-1:2w of Y to generate bits 3w-1:2w of product Z, and to add bits 3w-1:2w of modulus M to bits 3w-1:2w of product Z if the least-significant bit of product Z is 1, wherein multiplying the least-significant bit of X and bits 3w-1:2w of Y occurs at least partially contemporaneously with multiplying the least-significant bit of X and the least-significant w bits of Y, and adding the least-significant w bits of modulus M to the least-significant w bits of product Z if the least-significant bit of product Z is 1.

11. An apparatus according to claim 7, further comprising:

a memory to store product Z in a redundant format; and a conversion unit to convert product Z from a redundant format to a non-redundant format after a most-significant w bits of Y are multiplied by a most significant bit of X to generate a most-significant w bits of product Z.

12. An apparatus according to claim 7, the first processing element to multiply the least-significant bit of X and bits Aw-1:(A−1)w, A>1, of Y to generate bits Aw-1:(A−1)w of product Z, and to add bits Aw-1:(A−1)w of modulus M to bits Aw-1:(A−1)w of product Z if the least-significant bit of product Z is 1, and the second processing element to multiply the least-significant bit of X and bits (A+1)w-1:Aw of Y to generate bits (A+1)w-1:Aw of product Z, and to add bits (A+1)w-1:Aw of modulus M to bits (A+1)w-1:Aw of product Z if the least-significant bit of product Z is 1, wherein multiplying the least-significant bit of X and bits (A+1)w-1:Aw of Y occurs at least partially contemporaneously with multiplying the least-significant bit of X and bits Aw-1:(A−1)w of Y, and adding bits Aw-1:(A−1)w of modulus M to the bits Aw-1:(A−1)w of product Z if the least-significant bit of product Z is 1.

13. A system comprising:

a processor comprising a circuit to process multiplier X and multiplicand Y, the circuit comprising:

a first processing element to multiply a least-significant bit of X and a least-significant w bits of Y to generate a least-significant w bits of product Z, and to add a least-significant w bits of modulus M to the least-significant w bits of product Z if the least-significant bit of product Z is 1; and a second processing element to multiply the least-significant bit of X and bits 2w-1:w of Y to generate bits 2w-1:w of product Z, and to add bits 2w-1:w of modulus M to bits 2w-1:w of product Z if the least-significant bit of product Z is 1, wherein multiplying the least-significant bit of X and bits 2w-1:w of Y occurs at least partially contemporaneously with multiplying the least-significant bit of X and the least-significant w bits of Y, and adding the least-significant w bits of modulus M to the least-significant w bits of product Z if the least-significant bit of product Z is 1; and a double data rate memory coupled to the processor.

14. A system according to claim 13, the first processing element further to multiply bit one of X and a least-significant w bits of Y to generate an additional w bits, to add a least-significant w bits of modulus M to the additional w bits if the least-significant bit of product Z is 1, and to add the additional w bits to the least-significant w bits of product Z.

15. A system according to claim 14, the second processing element further to multiply bit one of X and bits 2w-1:w of Y to generate a second additional w bits, to adding bits 2w-1:w of modulus M to the second additional w bits if the least-significant bit of product Z is 1, and to add the second additional w bits to bits 2w-1:w of product Z, wherein multiplying bit one of X and bits 2w-1:w of Y occurs at least partially contemporaneously with multiplying bit one of X and the least-significant w bits of Y, adding the least-significant w bits of modulus M to the additional w bits of product Z if the least-significant bit of product Z is 1, and adding the additional w bits of product Z to the least-significant w bits of product Z.

16. A system according to claim 13, the circuit further comprising:

a third processing element to multiply the least-significant bit of X and bits 3w-1:2w of Y to generate bits 3w-1:2w of product Z, and to add bits 3w-1:2w of modulus M to bits 3w-1:2w of product Z if the least-significant bit of product Z is 1, wherein multiplying the least-significant bit of X and bits 3w-1:2w of Y occurs at least partially contemporaneously with multiplying the least-significant bit of X and the least-significant w bits of Y, and adding the least-significant w bits of modulus M to the least-significant w bits of product Z if the least-significant bit of product Z is 1.

17. A system according to claim 13, the circuit further comprising:

a memory to store product Z in a redundant format; and a conversion unit to convert product Z from a redundant format to a non-redundant format after a most-significant w bits of Y are multiplied by a most significant bit of X to generate a most-significant w bits of product Z.

18. A system according to claim 13, the first processing element to multiply the least-significant bit of X and bits Aw-1:(A−1)w, A>1, of Y to generate bits Aw-1:(A−1)w of product Z, and to add bits Aw-1:(A−1)w of modulus M to bits Aw-1:(A−1)w of product Z if the least-significant bit of product Z is 1, and the second processing element to multiply the least-significant bit of X and bits (A+1)w-1:Aw of Y to generate bits (A+1)w-1:Aw of product Z, and to add bits (A+1)w-1:Aw of modulus M to bits (A+1)w-1:Aw of product Z if the least-significant bit of product Z is 1, wherein multiplying the least-significant bit of X and bits (A+1)w-1:Aw of Y occurs at least partially contemporaneously with multiplying the least-significant bit of X and bits Aw-1:(A−1)w of Y, and adding bits Aw-1:(A−1)w of modulus M to the bits Aw-1:(A−1)w of product Z if the least-significant bit of product Z is 1.

\* \* \* \* \*